US012802167B2

(12) United States Patent
Dai et al.

(10) Patent No.: US 12,802,167 B2
(45) Date of Patent: Nov. 17, 2026

(54) WAVELET TRANSFORM BASED DEEP HIGH DYNAMIC RANGE IMAGING

(71) Applicant: HUAWEI TECHNOLOGIES CO., LTD., Shenzhen (CN)

(72) Inventors: Tianhong Dai, Shenzhen (CN); Shanxin Yuan, Shenzhen (CN); Xu Jia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 592 days.

(21) Appl. No.: 18/295,253

(22) Filed: Apr. 3, 2023

(65) Prior Publication Data

US 2023/0237627 A1 Jul. 27, 2023

Related U.S. Application Data

(63) Continuation of application No. PCT/CN2020/126617, filed on Nov. 5, 2020.

(51) Int. Cl.
*G06T 5/10* (2006.01)
*G06T 5/20* (2006.01)
(Continued)

(52) U.S. Cl.
CPC .................. *G06T 5/10* (2013.01); *G06T 5/20* (2013.01); *G06T 5/50* (2013.01); *G06T 5/90* (2024.01);
(Continued)

(58) Field of Classification Search
CPC .... G06T 5/10; G06T 5/20; G06T 5/50; G06T 5/90; G06T 2207/10144;
(Continued)

(56) References Cited

U.S. PATENT DOCUMENTS

| | | | | |
|---|---|---|---|---|
| 7,260,272 B2 | 8/2007 | Lin et al. | | |
| 2004/0008904 A1 * | 1/2004 | Lin | ........................ | G06V 10/30 382/302 |
| 2019/0096046 A1 * | 3/2019 | Kalantari | .................. | G06T 5/92 |

FOREIGN PATENT DOCUMENTS

| | | | | |
|---|---|---|---|---|
| CN | 111382795 A * | 7/2002 | ........... | G06K 9/6268 |
| CN | 111861957 A * | 10/2020 | ............... | G06T 5/50 |
| WO | WO-2019112085 A1 * | 6/2019 | .............. | G06F 17/11 |

OTHER PUBLICATIONS

Park, J. S., Soh, J. W., & Cho, N. I. (2018). High dynamic range and super-resolution imaging from a single image. IEEE Access, 6, 10966-10978. (Year: 2018).*

(Continued)

*Primary Examiner* — Gregory A Morse
*Assistant Examiner* — Renae A Bitor

(57) ABSTRACT

Described herein is an image processing apparatus (701) comprising one or more processors (704) configured to: receive (601) a plurality of input images (301, 302, 303); for each input image, form (602) a set of decomposed data by decomposing the input image (301, 302, 303) or a filtered version thereof (307, 308, 309) into a plurality of frequency-specific components (313) each representing the occurrence of features of a respective frequency interval in the input image or the filtered version thereof; process (603) each set of decomposed data using one or more convolutional neural networks to form a combined image dataset (327); and subject (604) the combined image dataset (327) to a construction operation that is adapted for image construction from a plurality of frequency-specific components to thereby form an output image (333) representing a combination of the input images. The resulting HDR output image may have fewer artifacts and provide a better quality result. The apparatus is also computationally efficient, having a good balance between accuracy and efficiency.

16 Claims, 8 Drawing Sheets

(51) Int. Cl.
*G06T 5/50* (2006.01)
*G06T 5/90* (2024.01)
*H04N 23/80* (2023.01)

(52) U.S. Cl.
CPC .............. *G06T 2207/10144* (2013.01); *G06T 2207/20064* (2013.01); *G06T 2207/20084* (2013.01); *G06T 2207/20208* (2013.01); *G06T 2207/20221* (2013.01); *H04N 23/80* (2023.01)

(58) Field of Classification Search
CPC . G06T 2207/20064; G06T 2207/20084; G06T 2207/20208; G06T 2207/20221; G06T 5/60; G06T 5/92; G06T 2207/20081; H04N 23/80; H04N 19/63
See application file for complete search history.

(56) References Cited

OTHER PUBLICATIONS

Ram Prabhakar, K., V. Sai Srikar, and R. Venkatesh Babu. "Deepfuse: A deep unsupervised approach for exposure fusion with extreme exposure image pairs." Proceedings of the IEEE international conference on computer vision. 2017. (Year: 2017).*

Pradeep Sen, Robust Patch-Based HDR Reconstruction of Dynamic Scenes, 2012, 11 pages.

Jun Hu, HDR Deghosting: How to deal with Saturation?, 2013, 8 pages.

T.-H. Oh, J.-Y. Lee, Y.-W. Tai and I. S. Kweon, "Robust High Dynamic Range Imaging by Rank Minimization," in IEEE Transactions on Pattern Analysis and Machine Intelligence, vol. 37, No. 6, pp. 1219-1232, Jun. 1, 2015, doi: 10.1109/TPAMI.2014.2361338. keywords: {Cameras;Minimization;Dynamic range;Robustness;Heuristic algorithms; Image reconstruction;High Dynamic Range Image;Rank minimization;RPCA;Matrix Completion;Multi-exposure fusion; Alignment;High dynamic range image;rank minimization;RPCA;matrix completion;multi-exposure fusion;alignment}.

Ryo Matsuoka et al., "Transformed-Domain Robust Multiple-Exposure Blending With Huber Loss", Nov. 6, 2019 (Nov. 6, 2019) pp. 162282-162296, XP011755382 total: 15pages.

Nima Khademi Kalantari and Ravi Ramamoorthi. Deep high dynamic range imaging of dynamic scenes. ACM Trans. Graph., 2017.

Qingsen Yan et al., "Attention-guided Network for Ghost-free High Dynamic Range Imaging", 2019 IEEE/CVF Conference on Computer Vision and Pattern Recognition (CVPR), total:10pages.

K.Ram Prabhakark, Susmit Agrawal, Durgesh Kumar Singh, Balraj Ashwath, and R. Venkatesh Babu, Towards practical and efficient high-resolution hdr deghosting with cnn. In Proceedings of the European Conference on Computer Vision (ECCV), 2020.

Shangzhe Wu, Jiarui Xu, Yu-Wing Tai, and Chi-Keung Tang. Deep high dynamic range imaging with large foreground motions. In Proceedings of the European Conference on Computer Vision (ECCV), 2018.

Qingsen Yan, Dong Gong, Pingping Zhang, Qingfeng Shi, Jinqiu Sun, Ian Reid, and Yanning Zhang. Multi-scale dense networks for deep high dynamic range imaging. In IEEE Winter Conference on Applications of Computer Vision (WACV), 2019.

Qingsen Yan, Lei Zhang, Yu Liu, Yu Zhu, Jinqiu Sun, Qinfeng Shi, and Yanning Zhang. Deep hdr imaging via a non-local network, IEEE Transactions on Image Processing, 2020.

Qingsen Yan, Dong Gong, Qinfeng Shi, Anton van den Hengel, Chunhua Shen, Ian Reid, and Yanning Zhang. Attention-guided network for ghost-free high dynamic range imaging. In Proceedings of the IEEE Conference on Computer Vision and Pattern Recognition (CVPR), 2019.

* cited by examiner

WAVELET TRANSFORM BASED DEEP HIGH DYNAMIC RANGE IMAGING

CROSS-REFERENCE TO RELATED APPLICATIONS

This application is a continuation of International Application No. PCT/CN2020/126617, filed on Nov. 5, 2020, the disclosure of which is hereby incorporated by reference in its entirety.

FIELD OF THE DISCLOSURE

This disclosure relates to the generation of High Dynamic Range (HDR) images.

BACKGROUND

HDR imaging using multiple Low Dynamic Range (LDR) images is a technique used in computational photography to generate high quality HDR images that have a large range of luminosity by utilizing the information from multiple LDR images.

A digital camera can usually capture a LDR image with a limited range of luminosity at one time, where the LDR image will have some over-exposed and/or under-exposed regions, degrading the image quality. For cameras used in wearable devices, there are limitations in sensors and apertures, thus the number of electrons to reach each pixel are limited, making it difficult to capture an HDR image at a time. Existing high-end digital devices use large sensors and large apertures to capture HDR images, making them difficult to integrate into wearable devices, such as smart phones. These large devices are also usually very expensive.

A practical solution is to capture several LDR images with different exposure times and merge them into a single HDR image. To generate an HDR image, an HDR imaging method should be able to restore the missing information (over-exposed and under-exposed regions) from multiple LDR images and keep the useful information.

FIG. 1 illustrates a typical HDR imaging framework, where the inputs are three LDR images 101-103 (with short 101, medium 102, and long 103 exposures) and the output is a high quality HDR image 104. The medium exposed image 102 (input2) is treated as a reference image and the short 101 and long 103 exposed images (input1 and input3 respectively) are supporting images. Note that there is camera motion and object motion between the reference image and the supporting images.

Existing methods working in this area suffer from different kinds of artifacts, including ghosting, missing details, color degradation and noise.

A good HDR imaging method should preferably fulfill the following requirements. The method should produce a high quality HDR image. The generated HDR image should preferably have no over-exposed or under-exposed regions, making good use of the complementing information from different LDR images of different exposures. The HDR image should also have good detail across the whole image, have correct color, and be noise-free. The resulting image should be ghost-free. The several captured LDR images usually have camera motion and object motion between them. When these LDR images are not aligned well, the ghosting artifact can occur in the final merged HDR image. The method should also preferably be computationally efficient to allow it to be deployed on wearable devices.

With the strong representation ability of deep convolutional neural networks (CNN), an increasing number of HDR imaging algorithms combined with deep neural networks have been proposed. In the method described in Nima Khademi Kalantari and Ravi Ramamoorthi, "Deep high dynamic range imaging of dynamic scenes", ACM Trans. Graph., 2017, the supporting images are aligned with the reference image by using optical flow. Then a CNN network is used to merge the aligned LDR images to generate an HDR image. The method described in K. Ram Prabhakark, Susmit Agrawal, Durgesh Kumar Singh, Balraj Ashwath, and R. Venkatesh Babu, "Towards practical and efficient high-resolution HDR deghosting with CNN", Proceedings of the European Conference on Computer Vision (ECCV), 2020 merges the input LDR images in the low resolution to save computational costs and uses a bilateral guided upsampler to restore the image to the original scale. However, these methods require optical flow to align the frames, which requires additional computational cost and some hardware does not support the warp operation, which means that this method cannot be deployed in such hardware.

In order to avoid using optical flow, the method described in Shangzhe Wu, Jiarui Xu, Yu-Wing Tai, and Chi-Keung Tang, "Deep high dynamic range imaging with large foreground motions", Proceedings of the European Conference on Computer Vision (ECCV), 2018 formulates the HDR imaging problem as an image-to-image translation problem. It uses a UNet structure network to map the input LDR images to an HDR image directly. However, it exhibits worse performance than the algorithms that use the optical flow. The method described in Qingsen Yan, Dong Gong, Pingping Zhang, Qingfeng Shi, Jinqiu Sun, Ian Reid, and Yanning Zhang, "Multi-scale dense networks for deep high dynamic range imaging", IEEE Winter Conference on Applications of Computer Vision (WACV), 2019 adopts three sub-networks with different scales to reconstruct the HDR image gradually. The method described in Qingsen Yan, Lei Zhang, Yu Liu, Yu Zhu, Jinqiu Sun, Qinfeng Shi, and Yanning Zhang, "Deep hdr imaging via a non-local network", IEEE Transactions on Image Processing, 2020 proposes NHDRRnet which uses a UNet to extract features in a low dimension, then features are sent into a global non-local network which can fuse features from inputs according to their correspondence. This method can remove the ghosting artifacts from the final output efficiently. However, the performance is still limited by the traditional UNet structure and is worse than the previous methods that use optical flow.

The method described in Qingsen Yan, Dong Gong, Qinfeng Shi, Anton van den Hengel, Chunhua Shen, Ian Reid, and Yanning Zhang, "Attention-guided network for ghost-free high dynamic range imaging", Proceedings of the IEEE Conference on Computer Vision and Pattern Recognition (CVPR), 2019 proposes a fixed-scale network with an attention module to deal with misalignment regions in the support frames and employs a dilated residual dense block to merge features into a single HDR image. Although the method may achieve state-of-the-art results, it is not computationally efficient, which makes it difficult for the method to be deployed on wearable devices.

It is desirable to develop a method that overcomes these problems.

SUMMARY

According to one aspect there is provided an image processing apparatus comprising one or more processors configured to: receive a plurality of input images; for each input image, form a set of decomposed data by decomposing the input image or a filtered version thereof into a plurality of frequency-specific components each representing the occurrence of features of a respective frequency interval in the input image or the filtered version thereof; process each set of decomposed data using one or more convolutional neural networks to form a combined image dataset; and subject the combined image dataset to a construction operation that is adapted for image construction from a plurality of frequency-specific components to thereby form an output image representing a combination of the input images.

The resulting HDR output image may have fewer artifacts and provide a better quality result than previous approaches. The apparatus is also computationally efficient, having a good balance between accuracy and efficiency.

The step of decomposing the input image may comprise subjecting the input image to a discrete wavelet transform (DWT) operation. This may help to reduce information loss during downsampling.

The construction operation may be an inverse discrete wavelet transform (IDWT) operation. This may allow the reconstruction of the signal using the output of DWT.

The apparatus may comprise a camera, or other imaging device. The apparatus may be configured to, in response to an input from a user of the apparatus, cause the camera or imaging device to capture the said plurality of input images, each of the input images being captured with a different exposure from others of the input images. This may allow a high quality HDR image to be generated that has a large range of luminosity by utilizing the information from multiple LDR images.

The decomposed data may be formed by decomposing a version of the respective input image filtered by a convolutional filter. This may allow for adjustment of the channel number of the input allow a feature map to be formed for each input image.

The apparatus may be configured to: mask and weight at least some areas of some of the sets of the decomposed data so as to form attention-filtered decomposed data; select a subset of components of the attention-filtered decomposed data that correspond to lower frequencies than other components of the attention-filtered decomposed data; merge at least the components of the subset of components to form merged data; and wherein the merged data forms an input to the construction operation. This may allow the lower frequency components to be merged.

The apparatus may be configured to decompose the attention-filtered data, merge relatively low frequency components of the attention-filtered data through a plurality of residual operations to form convolved low frequency data, and perform a reconstruction operation in dependence on relatively high frequency components of the attention-filtered data and the convolved low frequency data. This may allow the low frequency components to be merged and then upsampled with the high frequency components.

The apparatus may be configured to: for each input image, form the respective set of decomposed data by decomposing the input image or a filtered version thereof into a first plurality of sets of frequency-specific components each representing the occurrence of features of a respective frequency interval in the input image or the filtered version thereof, performing a convolution operation on each of the sets of frequency-specific components to form convolved data and decomposing the convolved data into a second plurality of sets of frequency-specific components each representing the occurrence of features of a respective frequency interval in the convolved data. This may allow each input image to be downsampled before merging.

The apparatus may be configured to: merge the first subset of the second plurality of sets of frequency-specific components to form first merged data; perform a masked and weighted combination of a first subset of the second plurality of sets of frequency-specific components and the first merged data to form first combined data; perform a first convolutional combination of a second subset of the second plurality of sets of frequency-specific components to form second combined data; upsample the first and second combined data to form first upsampled data; perform a masked and weighted combination of a first subset of the first plurality of sets of frequency-specific components and the first upsampled data to form third combined data; perform a second convolutional combination of a second subset of the first plurality of sets of frequency-specific components to form fourth combined data; upsample the third and fourth combined data to form second upsampled data; and wherein the output image is formed in dependence on the second upsampled data. This may allow for the fusion of several components with different frequency intervals from the different input images separately (e.g. low-frequency components and high-frequency components).

The first subsets may be subsets of relatively low frequency components. The second subsets may be subsets of relatively high frequency components. These components may result from the use of the discrete wavelet transform operation. Low-frequency components contain more structural information. Therefore, using low-frequency components in the merge stage may be beneficial for alleviating ghosting artifacts and recovering under-exposed and over-exposed regions of the inputs. High-frequency components can preserve detail information, which is helpful for reconstructing details during upsampling.

The output image may be formed in dependence on a combination of the second upsampled data and convolved versions of the input images. This may be achieved using a global residual connection. This may enhance the representation ability of the network.

According to a second aspect there is provided a computer-implemented image processing method comprising: receiving a plurality of input images; for each input image, forming a set of decomposed data by decomposing the input image or a filtered version thereof into a plurality of frequency-specific components each representing the occurrence of features of a respective frequency interval in the input image or the filtered version thereof; processing each set of decomposed data using one or more convolutional neural networks to form a combined image dataset; and subjecting the combined image dataset to a construction operation that is adapted for image construction from a plurality of frequency-specific components to thereby form an output image representing a combination of the input images.

The HDR image produced using this method may have fewer artifacts and provide a better quality result than previous methods. The method is also computationally efficient, having a good balance between accuracy and efficiency.

The plurality of input images may comprise a reference image and multiple supporting images, each supporting image having a longer or shorter exposure than the reference image. This may allow a high quality HDR image to be produced. There may be camera motion and object motion between the reference image and the supporting images.

BRIEF DESCRIPTION OF THE FIGURES

The present embodiments will now be described by way of example with reference to the accompanying drawings.

In the drawings.

DETAILED DESCRIPTION

The network implemented in the apparatus and method described herein is a Unet (as described in Ronneberger, Olaf, Philipp Fischer, and Thomas Brox. "U-net: Convolutional networks for biomedical image segmentation", International Conference on Medical image computing and computer-assisted intervention, pp. 234-241. Springer, Cham, 2015), which is a deep neural network architecture that is commonly used in image processing operations such as image denoising, super-resolution and joint-denoising-demosaicing.

Figure 1:
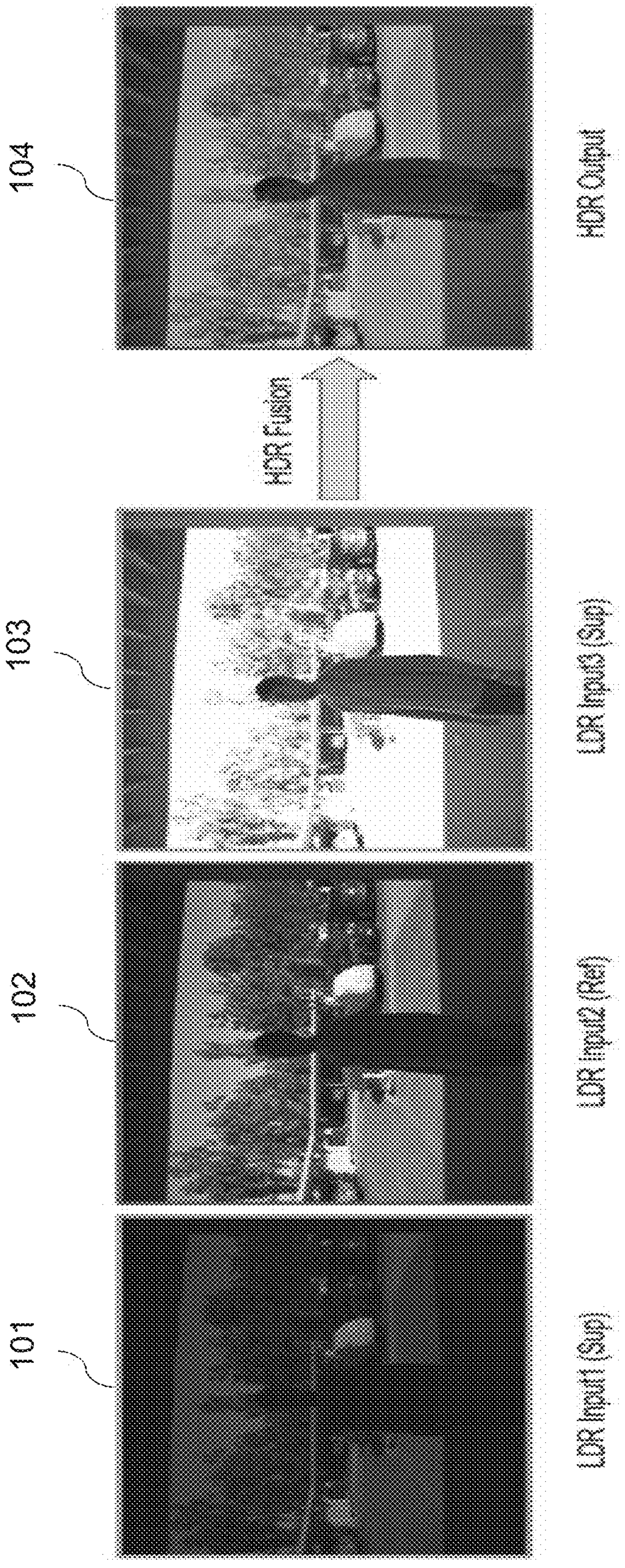
FIG. 1 shows an illustration of the HDR imaging task, taking input from multiple frames.
Figure 2:
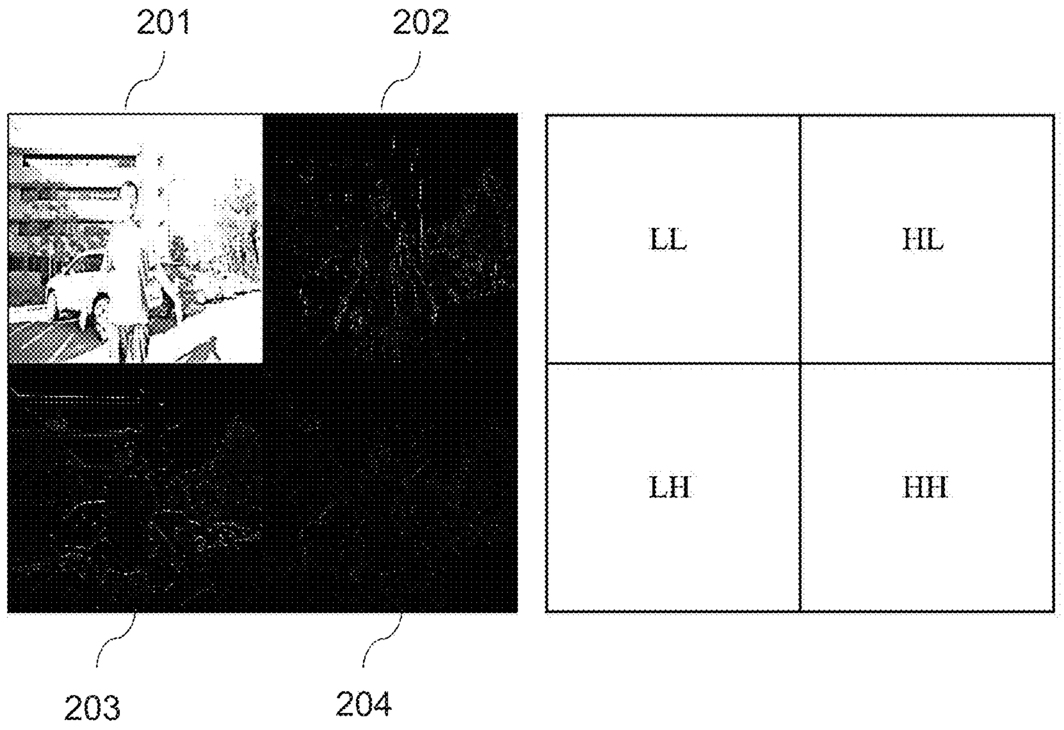
FIG. 2 schematically illustrates a discrete wavelet transform (DWT).

Wavelet transform is useful tool to transform an image into different groups of frequency components. As shown in FIG. 2, wavelet transform can decompose a signal corresponding to an image into components with different frequency intervals, referred to as low-low (LL), shown at 201, high-low (HL), shown at 202, low-high (LH), shown at 203 and high-high (HH), shown at 204.

In a preferred implementation, the apparatus and method described herein use wavelet transform combined with a Unet for HDR imaging using multiple LDR images as input. Discrete wavelet transform (DWT) and inverse discrete wavelet transform (IDWT) are used to replace the maxpooling/strided convolution operation in the Unet network. Using DWT may reduce the information loss during the downsampling. IDWT can reconstruct the signal using the output of DWT to restore feature maps to the original scale.

Wavelet transform is also used in a feature merging module for merging low-frequency components of the inputs. In the feature merging module, which takes the low-frequency components as input, a spatial attention module is used to handle the misaligned regions between the reference and supporting images.

Figure 3:
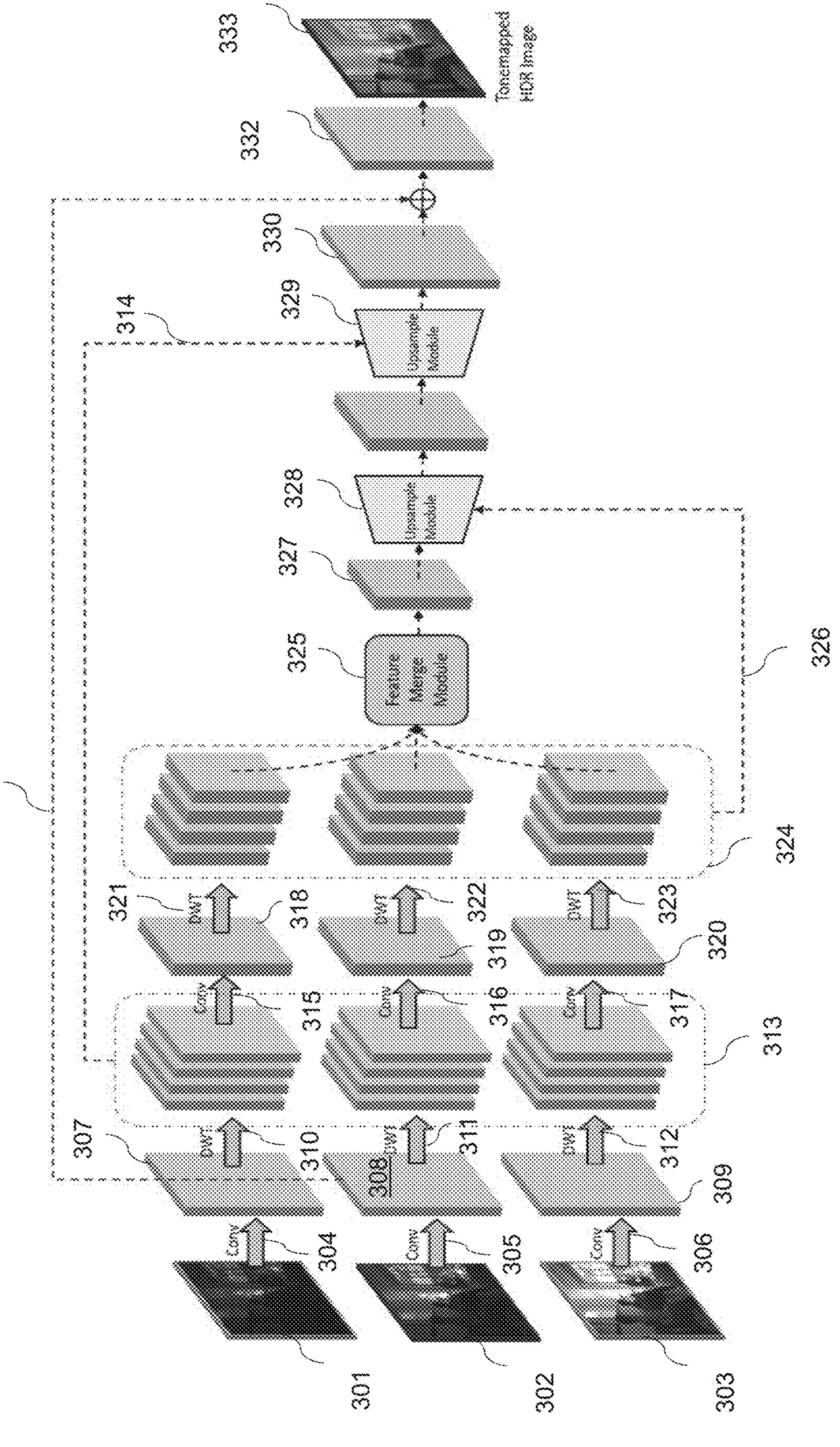
FIG. 3 shows a schematic illustration of the overall structure of the network.

FIG. 3 shows the overall network architecture of one implementation of the present disclosure. In addition to the basic Unet structure, the network also includes a feature merge module and two upsample modules.

Each LDR input is sent into an individual encoder of the same structure. In this example, three LDR inputs 301, 302 and 303 are used. For each input, a convolution layer 304, 305, 306 is used to adjust the channel number of the input and form feature maps 307, 308, 309.

As shown at 310, 311, 312, DWT is then used to decompose the feature map for each input into one low frequency component and three high frequency components, which are shown within the dashed box at 313. Thus, for each input image, a set of decomposed data is formed by decomposing the feature maps into a plurality of frequency-specific components each representing the occurrence of features of a respective frequency interval in the feature map.

As will be described in more detail below, each set of decomposed data is then processed using one or more convolutional neural networks to form a combined image dataset, which is subjected to a construction operation that is adapted for image construction from a plurality of frequency-specific components to thereby form an output image representing a combination of the input images.

In the example shown in FIG. 3, the decomposed data is formed by decomposing a version 307, 308, 309 of the respective input image 301, 302, 303 filtered by a convolutional filter 304, 305, 306. Each respective set of decomposed data is formed by decomposing the filtered image into a first plurality of sets of frequency-specific components each representing the occurrence of features of a respective frequency interval in the filtered image (feature map).

As shown in FIG. 3, in this example, while keeping the high frequency components for later stage (as illustrated by dashed line 314), the low frequency component of each set of decomposed data goes through another convolution layer 315, 316, 317 for feature extraction.

Convolved data 318, 319 and 320 respectively is formed. The convolved data is subsequently decomposed into a second plurality of sets of frequency-specific components each representing the occurrence of features of a respective frequency interval in the convolved data, as shown within dashed box 324. In this example, DWT is used again, as shown at 321, 322, 323 to decompose the feature maps 318, 319, 320 for each of the inputs into different frequency components (three high frequency and one low frequency), illustrated within dashed box 324, from which the low frequency components are sent into the feature merge module 325 (described later with reference to FIG. 4) where feature fusion is performed and the high frequency components are stored for a later stage (as illustrated by dashed line 326).

The fused feature map 327 is sent, along with the prestored low and high frequency components, to upsampling modules 328 and 329 sequentially to reconstruct the feature map to the original scale, shown at 330. In this example, a global residual connection, shown at 331, is added to enhance the representation ability of the network. The final feature map is shown at 332 and the tonemapped HDR image at 333.

Figure 4:
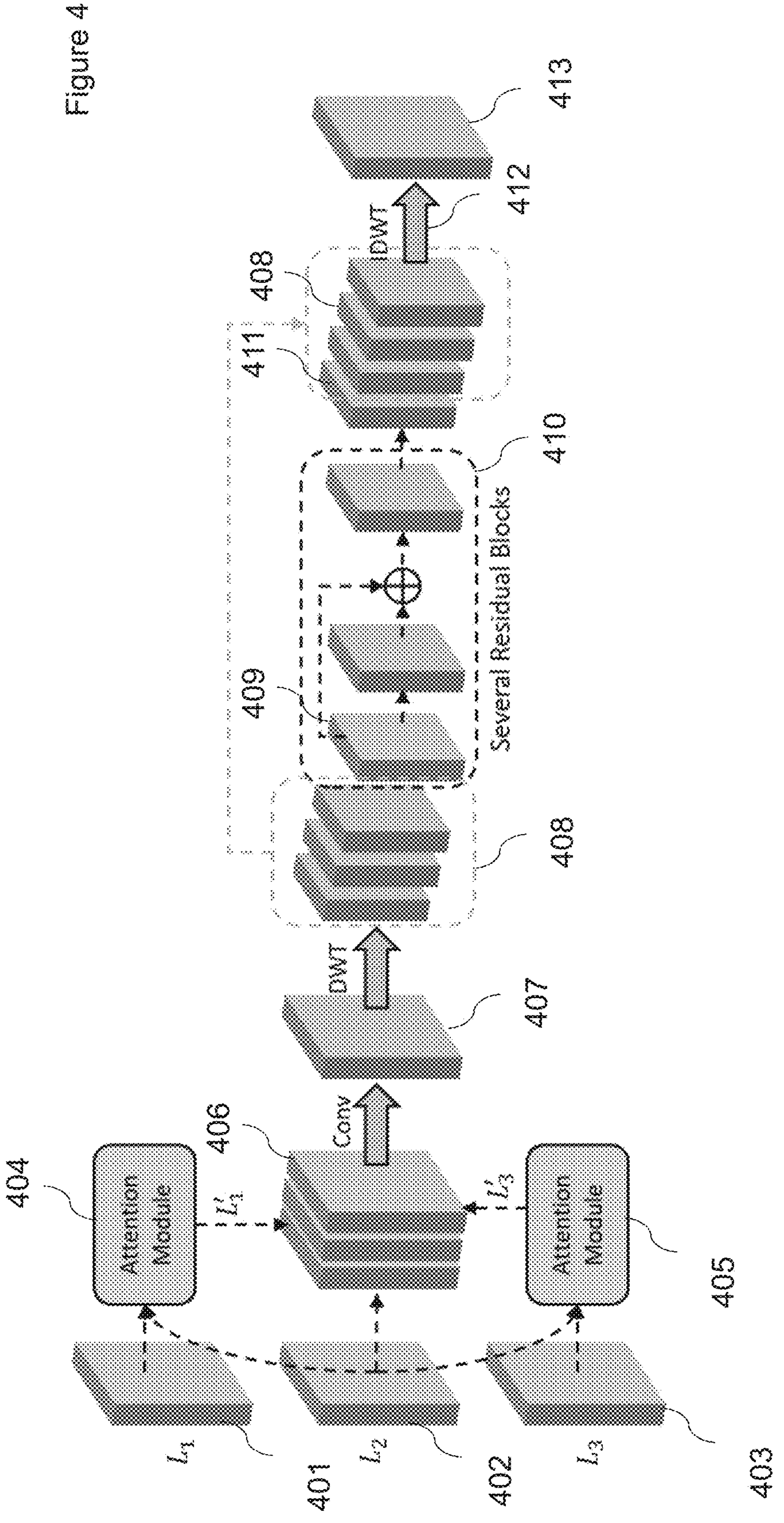
FIG. 4 shows a schematic illustration of the feature merge module.

FIG. 4 shows an exemplary illustration of the feature merge module (325 in FIG. 3). The inputs of the merge module are three low frequency components from different LDR images, shown at 401, 402 and 403. Here, $L_2$ is the low frequency component of the reference frame. $L_1$ and $L_3$ are the low frequency components of the supporting frames.

The apparatus is configured to mask and weight at least some areas of some of the sets of the decomposed data so as to form attention-filtered decomposed data. A subset of components of the attention-filtered decomposed data are selected that correspond to lower frequencies than other components of the attention-filtered decomposed data. This subset is merged to form merged data, which forms an input to the construction operation.

In the initial stage, the inputs $L_1$ and $L_3$ are sent into the attention modules 404 and 405 respectively separately along with the reference low frequency component $L_2$ to generate corresponding attention masks $$M_1^{att}$$

and $$M_3^{att}$$

Then the masks are applied to the corresponding input using the element-wise multiplication to get $$L_1'$$

and $$L_3':$$

$$L_1' = L_1 \odot M_1^{att} \quad (1)$$

$$L_3' = L_3 \odot M_3^{att} \quad (2)$$

$$L_1', L_2$$

and $$L_3'$$

are concatenated together, as shown at 406, and go through a convolution layer to squeeze the channel number of the feature map 407. DWT is then used to decompose the feature map 407 into different frequency components. The high frequency components are shown within dashed box 408. The low frequency component 409 goes through several residual blocks, indicated at 410, to merge the features into feature map 411. Finally, an IDWT layer 412 is used to restore the feature map to the original scale. The resulting feature map is shown at 413.

Therefore, in this example, the apparatus is further configured to decompose the attention-filtered data, merge relatively low frequency components of the attention-filtered data through a plurality of residual operations (the residual blocks shown at 410) to form convolved low frequency data, and perform a reconstruction operation in dependence on relatively high frequency components of the attention-filtered data and the convolved low frequency data.

In this example, for each input image, the apparatus is configured to form the respective set of decomposed data by decomposing the filtered feature map into a first plurality of sets of frequency-specific components each representing the occurrence of features of a respective frequency interval in the feature map, perform a convolution operation on each of the sets of frequency-specific components to form convolved data and decompose the convolved data into a second plurality of sets of frequency-specific components each representing the occurrence of features of a respective frequency interval in the convolved data.

The first subset of the second plurality of sets of frequency-specific components are merged to form first merged data. A masked and weighted combination of a first subset of the second plurality of sets of frequency-specific components and the first merged data is performed to form first combined data. A first convolutional combination of a second subset of the second plurality of sets of frequency-specific components is performed to form second combined data. The first and second combined data are upsampled to form first upsampled data. A masked and weighted combination of a first subset of the first plurality of sets of frequency-specific components (corresponding to the relatively low frequency components) and the first upsampled data is performed to form third combined data.

A second convolutional combination of a second subset of the first plurality of sets of frequency-specific components (corresponding to the relatively high frequency components) is performed to form fourth combined data.

The third and fourth combined data is upsampled to form second upsampled data and, as a result of the global residual connection 331 in FIG. 3, the output image is formed in dependence on the second upsampled data and convolved versions of the input images.

Figure 5:
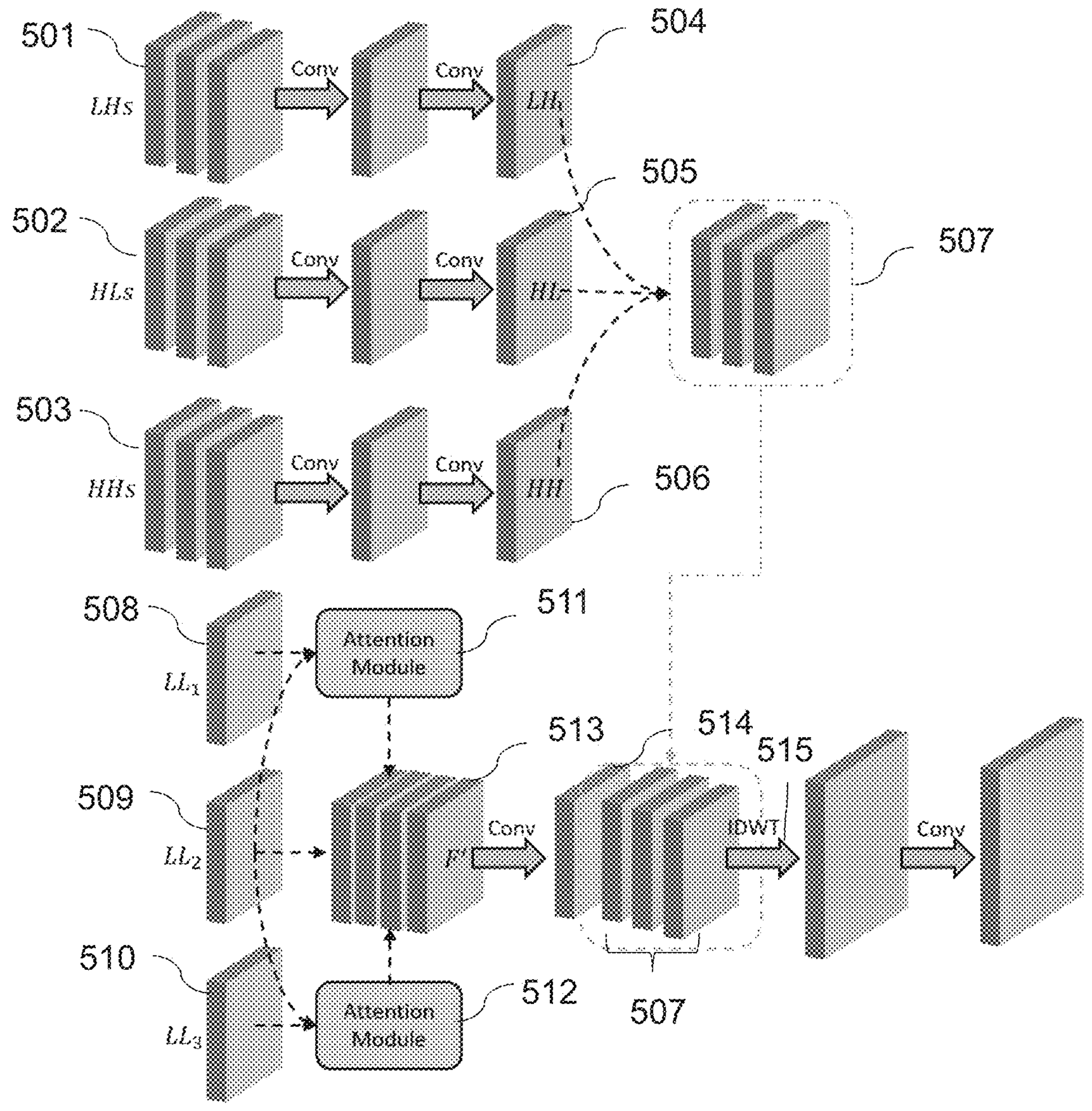
FIG. 5 shows a schematic illustration of the upsample module.

FIG. 5 shows an exemplary illustration of the upsample module. In contrast to previous computer vision tasks using wavelet transform, which only have single input (such as denoising, classification), the HDR imaging task generally has more than one input LDR image. Therefore, after each DWT layer, multiple groups of low and high components can be achieved, for example:

$$L_1 \overset{DWT}{\Longrightarrow} LL_1, LH_1, HL_1, HH_1 \quad (3)$$

$$L_2 \overset{DWT}{\Longrightarrow} LL_2, LH_2, HL_2, HH_2 \quad (4)$$

$$L_3 \overset{DWT}{\Longrightarrow} LL_3, LH_3, HL_3, HH_3 \quad (5)$$

Here $L_n$ is the $n^{th}$ input and $[LL_n, LH_n, HL_n, HH_n]$ are the components with different frequency intervals from the $n^{th}$ input. However, when IDWT is used to upsample the feature map, only one set of these components is used. In the method described herein, the learnable merging module merges these low and high frequency components into one set that can be used during upsampling. Firstly, for the high frequency components, the components with the same $$LHs = \text{Concat}\ (LH_1, LH_2, LH_3) \quad (6)$$

$$HLs = \text{Concat}\ (HL_1, HL_2, HL_3) \quad (7)$$

$$HHs = \text{Concat}\ (HH_1, HH_2, HH_3) \quad (8)$$

These grouped components are shown at 501, 502 and 503 respectively in FIG. 5. These grouped components are then passed through several convolution layers to generate one set of high frequency components, shown at 504, 505 and 506 respectively, and collectively at 507.

The low frequency components $LL_n$, shown at 508, 509, 510, are fused following the steps in the feature merge module ($LL_1$ and $LL_3$ are sent into the attention modules 511 and 512 respectively separately along with the reference low frequency component $LL_2$ to generate corresponding attention masks $$M_1^{att}$$

and $$M_3^{att}$$

and the masks are applied to the corresponding input using the element-wise multiplication to get $$L_1' \text{ and } L_3')$$

and then concatenated with the feature map F' 513 from the previous layer to generate a single low frequency component, shown at 514. As shown at 515, IDWT is then used to restore the feature map to the original scale using the generated low 514 and high 507 frequency components.

As described above, for the input of the network, a set of LDR images $\{L_1, L_2, L_3\}$ is used. This set of LDR images is mapped to the HDR domain $\{H_1, H_2, H_3\}$ according to the gamma correction:

$$H_i = \frac{L_i^\gamma}{t_i} \tag{9}$$

where $\gamma$ is the gamma correction parameter and $t_i$ is the exposure time of the LDR image $L_i$. These two sets of images are concatenated together to generate the final input set $\{X_1, X_2, X_3\}$:

$$X_i = \text{Concat}(L_i, H_i) \tag{10}$$

In the method described herein, the HDR imaging task is formulated as an image-to-image translation problem. Thus, the network is trained through minimizing the L1 loss between the predicted tonemapped output $T(\hat{H})$ and the tonemapped ground truth $T(H)$:

$$\text{Loss} = \|T(\hat{H}) - T(H)\|_1 \tag{11}$$

where $T(\bullet)$ is the μ-law function which can be written as:

$$T(H) = \frac{\log(1 + \mu H)}{\log(1 + H)} \tag{12}$$

where μ is the coefficient to control the compression.

The method described herein therefore constitutes a learning-based approach combined with wavelet transform for HDR image fusion of inputs from multiple frames.

As described above, the apparatus comprises a wavelet transform module to decompose inputs into several components with different frequency intervals in the feature space, a parameterized learning module to process the feature fusion of the low-frequency component and high-frequency components in the network and an attention module to deal with the misalignment regions in the support frames.

Optical flow is not required in the method described herein.

The learnable modules are used to fuse several components with different frequency intervals from the different input images separately (low-frequency components and high-frequency components). For the feature merge module, only low-frequency components are adopted. Low-frequency components contain more structural information. Therefore, using low-frequency components in the merge stage may be beneficial for alleviating ghosting artifacts and recovering under-exposed and over-exposed regions of the inputs. High-frequency components can preserve detail information, which is helpful for reconstructing details during upsampling.

Figure 6:
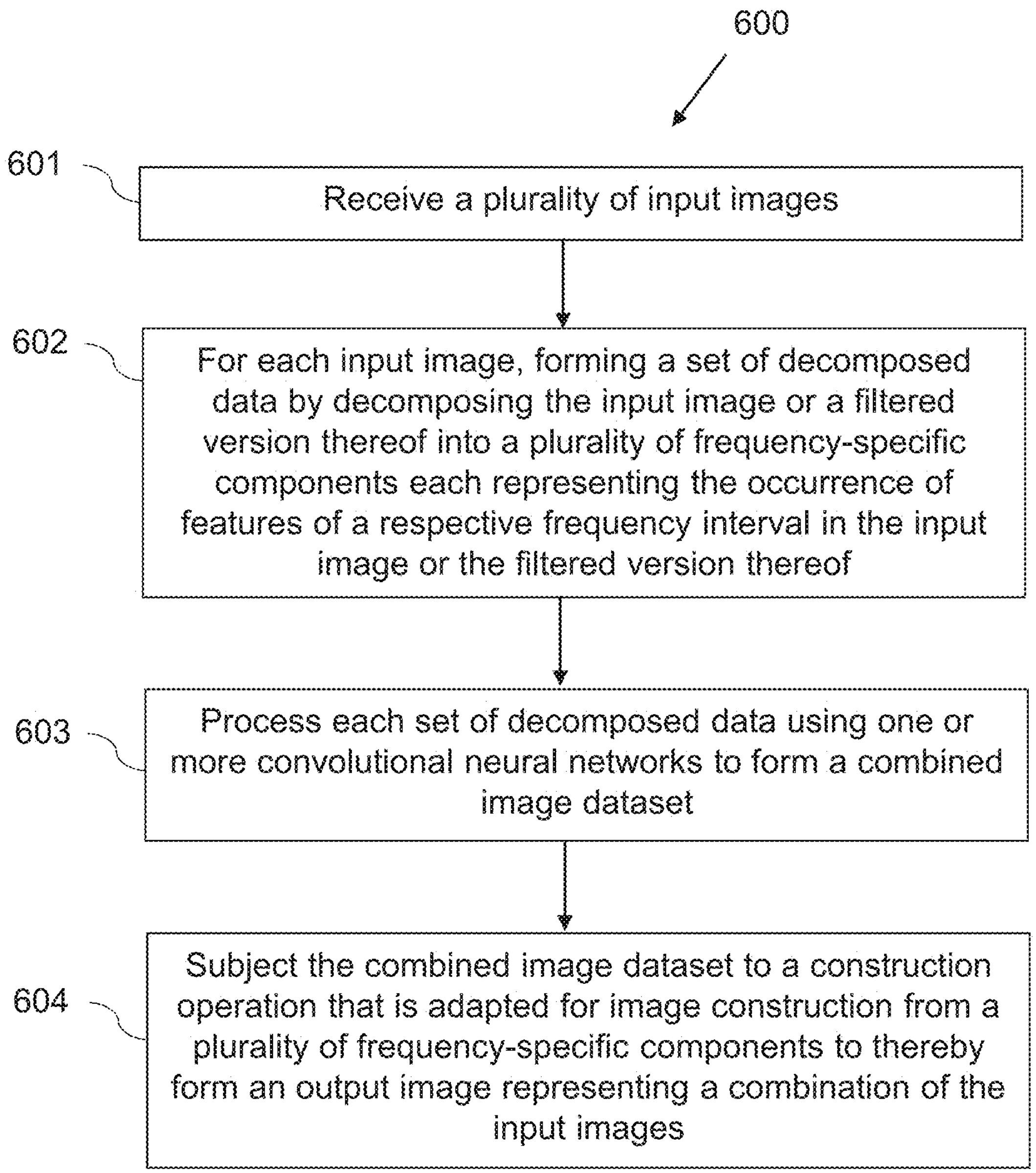
FIG. 6 shows an example of a computer-implemented image processing method.

FIG. 6 shows an example of a computer-implemented image processing method. At step 601, the method comprises receiving a plurality of input images. At step 602, the method comprises, for each input image, forming a set of decomposed data by decomposing the input image or a filtered version thereof into a plurality of frequency-specific components each representing the occurrence of features of a respective frequency interval in the input image or the filtered version thereof. At step 603, the method comprises processing each set of decomposed data using one or more convolutional neural networks to form a combined image dataset. At step 604, the method comprises subjecting the combined image dataset to a construction operation that is adapted for image construction from a plurality of frequency-specific components to thereby form an output image representing a combination of the input images.

The apparatus may comprise an imaging device, such as a camera. The apparatus may be configured to, in response to an input from a user of the apparatus, cause the camera, or other imaging device, to capture each of the input images with a different exposure from the other input images.

Figure 7:
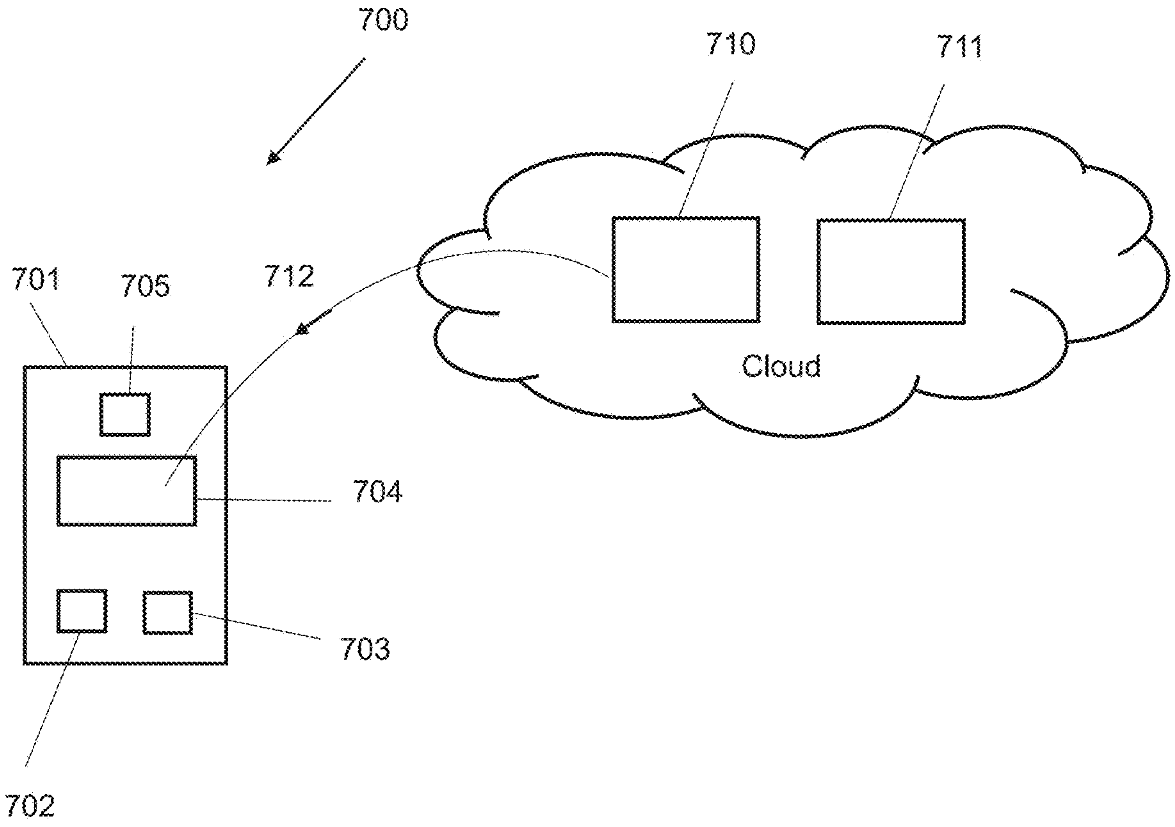
FIG. 7 shows an example of a device configured to implement the method described herein.

FIG. 7 shows an example of apparatus 700 comprising a imaging device 701 configured to use the method describe herein to process image data captured by at least one image sensor in the device. The device 701 comprises image sensors 702, 703. Such a device 701 typically includes some onboard processing capability. This could be provided by the processor 704. The processor 704 could also be used for the essential functions of the device.

The transceiver 705 is capable of communicating over a network with other entities 710, 711. Those entities may be physically remote from the device 701. The network may be a publicly accessible network such as the internet. The entities 710, 711 may be based in the cloud. Entity 710 is a computing entity. Entity 711 is a command and control entity. These entities are logical entities. In practice they may each be provided by one or more physical devices such as servers and data stores, and the functions of two or more of the entities may be provided by a single physical device. Each physical device implementing an entity comprises a processor and a memory. The devices may also comprise a transceiver for transmitting and receiving data to and from the transceiver 705 of device 701. The memory stores in a non-transient way code that is executable by the processor to implement the respective entity in the manner described herein.

The command and control entity 711 may train the model used in the device. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical imaging device.

In one implementation, once the algorithms have been developed in the cloud, the command and control entity can automatically form a corresponding model and cause it to be transmitted to the relevant imaging device. In this example, the model is implemented at the device 701 by processor 704.

In another possible implementation, an image may be captured by one or both of the sensors 702, 703 and the image data may be sent by the transceiver 705 to the cloud for processing. The resulting image could then be sent back to the device 701, as shown at 712 in FIG. 7.

Therefore, the method may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g. using an inference engine.

Unlike prior methods, the approach described herein does not need to use optical flow to align the input frames. DWT is advantageously employed to reduce information loss caused by maxpooling and strided convolution operations. DWT is advantageously used to perform the downsampling and IDWT is used for the upsampling.

Not using optical flow can save computational cost. Furthermore, some hardware does not support optical flow. Therefore, the method described herein may be used on a wider range of hardware and may be deployed in mobile devices.

Because of the wavelet transform, the information loss is reduced during downsampling. Thus, HDR images with better quality can be generated. Compared with previous methods, embodiments of the present disclosure may achieve a good balance between image quality and computational efficiency.

Figure 8:
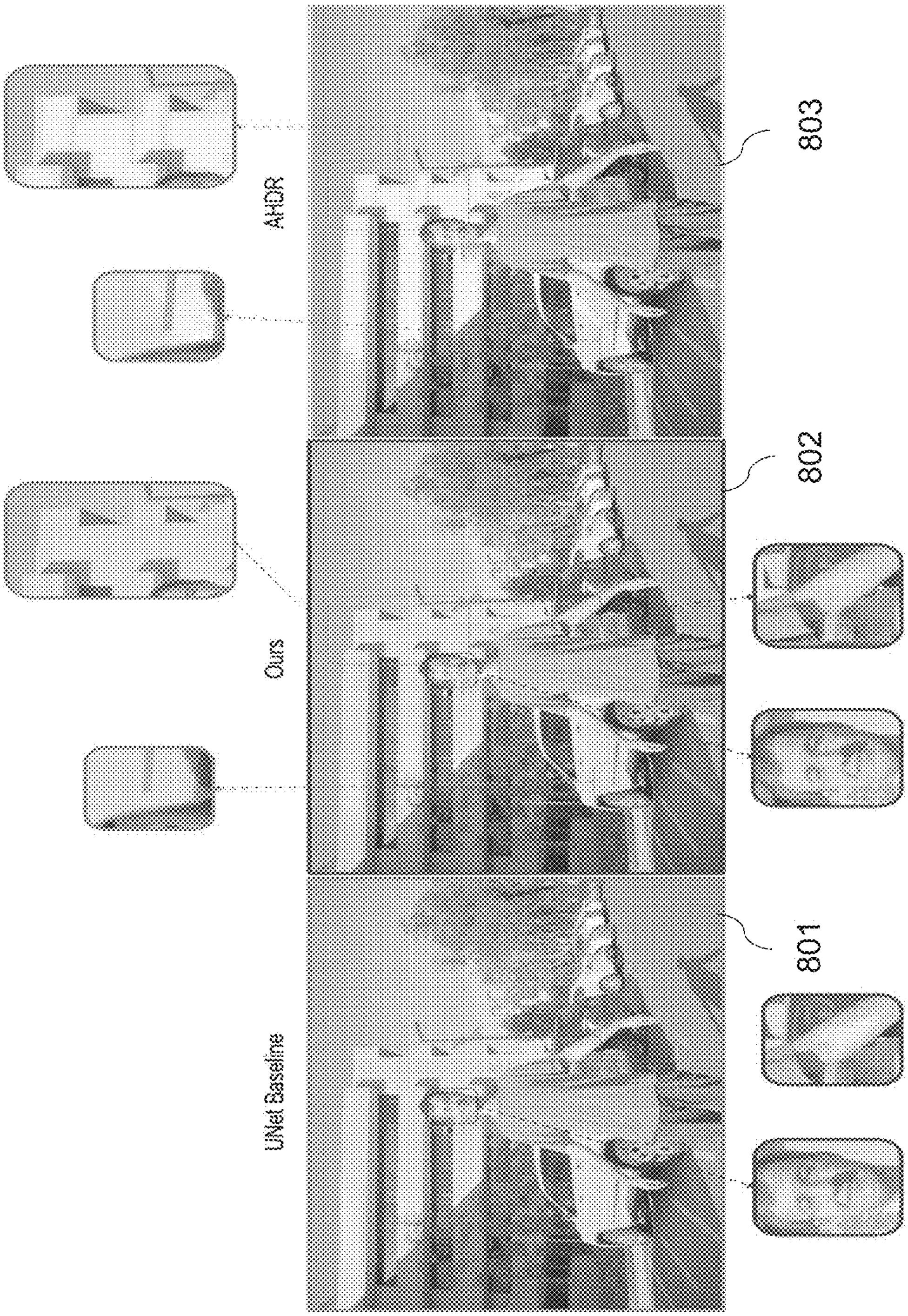
FIG. 8 shows a qualitative comparison between results produced using the method described herein and baseline methods.

FIG. 8 shows a qualitative comparison between the method described herein (image 802) and baseline methods Unet (801) and AHDR (803). From FIG. 8, it can be seen that, in this example, Unet produces artifacts in the human face and arm and AHDR produces artifacts in the car and building. The HDR image produced using the method described herein does not have such artifacts and provides a better quality result. The method may achieve state-of-the-art performance and is also computationally efficient, having a good balance between accuracy and efficiency.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

The invention claimed is:

1. An image processing apparatus comprising one or more processors and one or more memories comprising instructions, the one or more processors configured to execute the instructions to cause the apparatus to perform the following:

receive a plurality of input images, wherein the plurality of input images are low dynamic range (LDR) images with different exposures;

for each input image, form a set of decomposed data by decomposing the input image or a filtered version thereof into a plurality of frequency-specific components each representing the occurrence of features of a respective frequency interval in the input image or the filtered version thereof, performing a convolution operation on each of the sets of frequency-specific components to form convolved data, and decomposing the convolved data into a second plurality of sets of frequency-specific components each representing the occurrence of features of a respective frequency interval in the convolved data;

process each set of decomposed data using one or more convolutional neural networks to form a combined image dataset, the processing comprising steps of:

merging the first subset of the second plurality of sets of frequency-specific components to form first merged data;

performing a masked and weighted combination of a first subset of the second plurality of sets of frequency-specific components and the first merged data to form first combined data;

performing a first convolutional combination of a second subset of the second plurality of sets of frequency-specific components to form second combined data;

upsampling the first and second combined data to form first upsampled data;

performing a masked and weighted combination of a first subset of the first plurality of sets of frequency-specific components and the first upsampled data to form third combined data;

performing a second convolutional combination of a second subset of the first plurality of sets of frequency-specific components to form fourth combined data;

upsampling the third and fourth combined data to form second upsampled data; and perform a construction operation on the combined image data set, wherein the construction operation is adapted for image construction from a plurality of frequency-specific components, to thereby form a high dynamic range (HDR) output image representing a combination of the input images.

2. The image processing apparatus as claimed in claim 1, wherein the step of decomposing the input image comprises performing a discrete wavelet transform operation on the input image.

3. The image processing apparatus as claimed in claim 1, wherein the construction operation is an inverse discrete wavelet transform operation.

4. The image processing apparatus as claimed in claim 1, the apparatus comprising a camera and the apparatus being configured to, in response to an input from a user of the apparatus, cause the camera to capture the said plurality of input images, each of the input images being captured with a different exposure from others of the input images.

5. The image processing apparatus as claimed in claim 1, wherein the decomposed data is formed by decomposing a version of the respective input image filtered by a convolutional filter.

6. The image processing apparatus as claimed in claim 1, wherein the apparatus is configured to:

mask and weight at least some areas of some of the sets of the decomposed data so as to form attention-filtered decomposed data;

select a subset of components of the attention-filtered decomposed data that correspond to lower frequencies than other components of the attention-filtered decomposed data;

merge at least the components of the subset of components to form merged data; and wherein the merged data form an input to the construction operation.

7. The image processing apparatus as claimed in claim 6, wherein the apparatus is configured to decompose the attention-filtered data, merge relatively low frequency components of the attention-filtered data through a plurality of residual operations to form convolved low frequency data, and perform a reconstruction operation in dependence on relatively high frequency components of the attention-filtered data and the convolved low frequency data.

8. The image processing apparatus as claimed in claim 1, wherein the first subsets are subsets of relatively low frequency components.

9. The image processing apparatus as claimed in claim 1, wherein the second subsets are subsets of relatively high frequency components.

10. The image processing apparatus as claimed in claim 1, wherein the output image is formed in dependence on a combination of the second upsampled data and convolved versions of the input images.

11. A computer-implemented image processing method comprising:

receiving a plurality of input images, wherein the plurality of input images are low dynamic range (LDR) images with different exposures;

for each input image, forming a set of decomposed data by decomposing the input image or a filtered version thereof into a plurality of frequency-specific components each representing the occurrence of features of a respective frequency interval in the input image or the filtered version thereof, performing a convolution operation on each of the sets of frequency-specific components to form convolved data, and decomposing the convolved data into a second plurality of sets of frequency-specific components each representing the occurrence of features of a respective frequency interval in the convolved data;

processing each set of decomposed data using one or more convolutional neural networks to form a combined image dataset, the processing comprising steps of:

merging the first subset of the second plurality of sets of frequency-specific components to form first merged data;

performing a masked and weighted combination of a first subset of the second plurality of sets of frequency-specific components and the first merged data to form first combined data;

performing a first convolutional combination of a second subset of the second plurality of sets of frequency-specific components to form second combined data;

upsampling the first and second combined data to form first upsampled data;

performing a masked and weighted combination of a first subset of the first plurality of sets of frequency-specific components and the first upsampled data to form third combined data;

performing a second convolutional combination of a second subset of the first plurality of sets of frequency-specific components to form fourth combined data;

upsampling the third and fourth combined data to form second upsampled data; and subjecting the combined image dataset to a construction operation that is adapted for image construction from a plurality of frequency-specific components to thereby form an output image representing a high dynamic range (HDR) combination of the input images.

12. The method as claimed in claim 11, wherein the step of decomposing the input image comprises performing a discrete wavelet transform operation on the input image.

13. The method as claimed in claim 11, wherein the construction operation is an inverse discrete wavelet transform operation.

14. The method as claimed in claim 11, wherein the decomposed data is formed by decomposing a version of the respective input image filtered by a convolutional filter.

15. The method as claimed in claim 11, further comprising:

masking and weighting at least some areas of some of the sets of the decomposed data so as to form attention-filtered decomposed data;

selecting a subset of components of the attention-filtered decomposed data that correspond to lower frequencies than other components of the attention-filtered decomposed data;

merging at least the components of the subset of components to form merged data; and wherein the merged data form an input to the construction operation.

16. The method as claimed in claim 15, further comprising decomposing the attention-filtered data, merging relatively low frequency components of the attention-filtered data through a plurality of residual operations to form convolved low frequency data, and performing a reconstruction operation in dependence on relatively high frequency components of the attention-filtered data and the convolved low frequency data.

* * * * *